United States Patent
Yao et al.

(10) Patent No.: US 12,322,156 B2
(45) Date of Patent: Jun. 3, 2025

(54) INPUT IMAGE SIZE SWITCHABLE NETWORK FOR ADAPTIVE RUNTIME EFFICIENT IMAGE CLASSIFICATION

(71) Applicant: Intel Corporation, Santa Clara, CA (US)

(72) Inventors: Anbang Yao, Beijing (CN); Yikai Wang, Beijing (CN); Ming Lu, Beijing (CN); Shandong Wang, Beijing (CN); Feng Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 339 days.

(21) Appl. No.: 17/918,080

(22) PCT Filed: Jun. 15, 2020

(86) PCT No.: PCT/CN2020/096035
§ 371 (c)(1),
(2) Date: Oct. 10, 2022

(87) PCT Pub. No.: WO2021/253148
PCT Pub. Date: Dec. 23, 2021

(65) Prior Publication Data
US 2023/0343068 A1    Oct. 26, 2023

(51) Int. Cl.
*G06V 10/764* (2022.01)
*G06V 10/32* (2022.01)
(Continued)

(52) U.S. Cl.
CPC ............ *G06V 10/764* (2022.01); *G06V 10/32* (2022.01); *G06V 10/454* (2022.01); *G06V 10/774* (2022.01); *G06V 10/82* (2022.01)

(58) Field of Classification Search
CPC .... G06V 10/764; G06V 10/454; G06V 10/32; G06V 10/774
(Continued)

(56) References Cited

U.S. PATENT DOCUMENTS

2015/0161170 A1    6/2015   Yee et al.
2018/0315399 A1*  11/2018  Kaul ....................... G06F 7/483
(Continued)

FOREIGN PATENT DOCUMENTS

CN    104537393    4/2015
CN    105975931    9/2016
(Continued)

OTHER PUBLICATIONS

International Preliminary Report on Patentability for PCT Patent Application No. PCT/CN2020/096035, dated Dec. 29, 2022.
(Continued)

*Primary Examiner* — William D Titcomb
(74) *Attorney, Agent, or Firm* — Hanley, Flight & Zimmerman, LLC

(57) ABSTRACT

Techniques related to implementing and training image classification networks are discussed. Such techniques include applying shared convolutional layers to input images regardless of resolution and applying normalization selectively based on the input image resolution. Such techniques further include training using mixed image size parallel training and mixed image size ensemble distillation.

21 Claims, 7 Drawing Sheets

(51) Int. Cl.
*G06V 10/44* (2022.01)
*G06V 10/774* (2022.01)
*G06V 10/82* (2022.01)

(58) Field of Classification Search
USPC .......................................................... 382/156
See application file for complete search history.

(56) References Cited

U.S. PATENT DOCUMENTS

| | | | | |
|---|---|---|---|---|
| 2019/0318502 | A1* | 10/2019 | He | G06F 18/2148 |
| 2020/0258223 | A1* | 8/2020 | Yip | G06F 18/21 |
| 2020/0320748 | A1* | 10/2020 | Levinshtein | G06T 7/90 |
| 2020/0388033 | A1* | 12/2020 | Matlock | G06V 10/774 |
| 2023/0343068 | A1* | 10/2023 | Yao | G06V 10/454 |

FOREIGN PATENT DOCUMENTS

| | | |
|---|---|---|
| CN | 107967484 | 4/2018 |
| CN | 110472681 A | 11/2019 |
| CN | 111179212 A | 5/2020 |
| WO | 2018109505 A1 | 6/2018 |
| WO | 2019233244 A1 | 12/2019 |

OTHER PUBLICATIONS

International Search Report and Written Opinion for PCT Application No. PCT/CN2020/096035, dated Mar. 11, 2021.

Elad, H., et al., "Mix & Match: Training Convnets with Mixed Image Sizes for Improved Accuracy, Speed and Scale Resiliency", https://arxiv.org/abs/1908.08986; Aug. 12, 2019.

He, K., et al., "Deep residual learning for image recognition", CVPR (2016).

Howard, Andrew G., et al., "MobileNets: Efficient Convolutional Neural Networks for Mobile Vision Applications", https://arxiv.org/abs/1704.04861, Apr. 17, 2017.

Sandler, M., et al., "Mobilenetv2: Inverted residuals and linear bottlenecks", CVPR (2018).

Yu, J., et al., "Slimmable neural networks", ICLR (2019).

Yu, J., et al., "Universally slimmable networks and improved training techniques", ICCV (2019).

Zhang, D., et al., "LQ-Nets: Learned quantization for highly accurate and compact deep neural networks", ECCV (2018).

Zhao et al., "Pyramid Scene Parsing Network," Arxiv.org, Cornell university Library, Dec. 4, 2016, 11 pages.

Redmon et al. "YOLO9000: Better, Faster, Stronger," 2017 IEEE Conference on Computer Vision and Pattern Recognition (CVPR), Dec. 25, 2016, 9 pages.

Zhu et al., "A 3D Coarse-to-Fine Framework for Volumetric Medical Image Segmentation," 2018 International Conference on 3D Vision (3DV), 2018, 9 pages.

Ge et al., "Low-Resolution Face Recognition in the Wild via Selective Knowledge Distillation," IEEE Transactions on Image Processing, vol. 28, No. 4, Apr. 2019, 12 pages.

Valada et al., "Self-Supervised Model Adaptation for Multimodal Semantic Segmentation," Arxiv.org, Cornell University Library, Jul. 8, 2019, 44 pages.

Li et al., "Learning to Learn Parameterized Classification Networks for Scalable Input Images," Arxiv.org, Cornell University Library, Jul. 13, 2020, 26 pages.

Wang et al., "Resolution Switchable Networks for Runtime Efficient Image Recognition," Computer Vision and Pattern Recognition, Jul. 29, 2020, 20 pages.

Japan Patent Office, "Decision to Grant a Patent," issued in connection with Japanese Patent Application No. 2022-564542, dated Feb. 20, 2024, 5 pages. [English Translation Included].

European Patent Office, "Extended European Search Report," issued in connection with European Patent Application No. 20941170.1, dated Feb. 26, 2024, 10 pages.

* cited by examiner

INPUT IMAGE SIZE SWITCHABLE NETWORK FOR ADAPTIVE RUNTIME EFFICIENT IMAGE CLASSIFICATION

CLAIM OF PRIORITY

This Application is a National Stage Entry of, and claims priority to, PCT Application No. PCT/CN2020/096035, filed on 15 Jun. 2020 and titled "INPUT IMAGE SIZE SWITCHABLE NETWORK FOR ADAPTIVE RUNTIME EFFICIENT IMAGE CLASSIFICATION", which is incorporated by reference in its entirety for all purposes.

BACKGROUND

Deep Convolutional Neural Networks (CNNs) are employed in a variety of image classification applications. Despite advances in CNN architectures for accuracy improvement, the intensive memory storage, computation, and energy costs of top-performing CNN models restrict their deployments on resource-constrained devices, especially in real-time applications. Typically, for multiple image size implementations, an individual CNN model is trained for each target image size with the total number of models to be trained and saved proportional to the number of target image sizes to be considered at runtime. Without training an individual CNN model for each target image size, the accuracy of the models deteriorates if applying a model trained with a particular image size to images with other sizes. Therefore, a model for each target image size needs to be stored, which brings high memory storage costs. In addition to the high memory storage costs, each image size adjustment must be accompanied with the extra latency to offload and load the respective model parameters for the different CNN models, especially for clouding computing application scenarios. In the context of such multiple models, current techniques attempt to strike an accuracy-efficiency tradeoff for CNN models by adjusting the structural configurations of the network (e.g., adjusting the network depths, widths and building blocks), pruning redundant parameters, filters, and channels of pre-trained models, using quantized low-precision CNN models instead of full-precision counterparts, transferring knowledge of a large and powerful model to improve a target smaller student model, and splitting a large model into several smaller models.

There is an ongoing need for memory, computation, and energy efficient CNN models for image classification applications. It is with respect to these and other considerations that the present improvements have been needed. Such improvements may become critical as the implementation of CNN models in a variety of contexts, particularly resource-constrained devices, becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
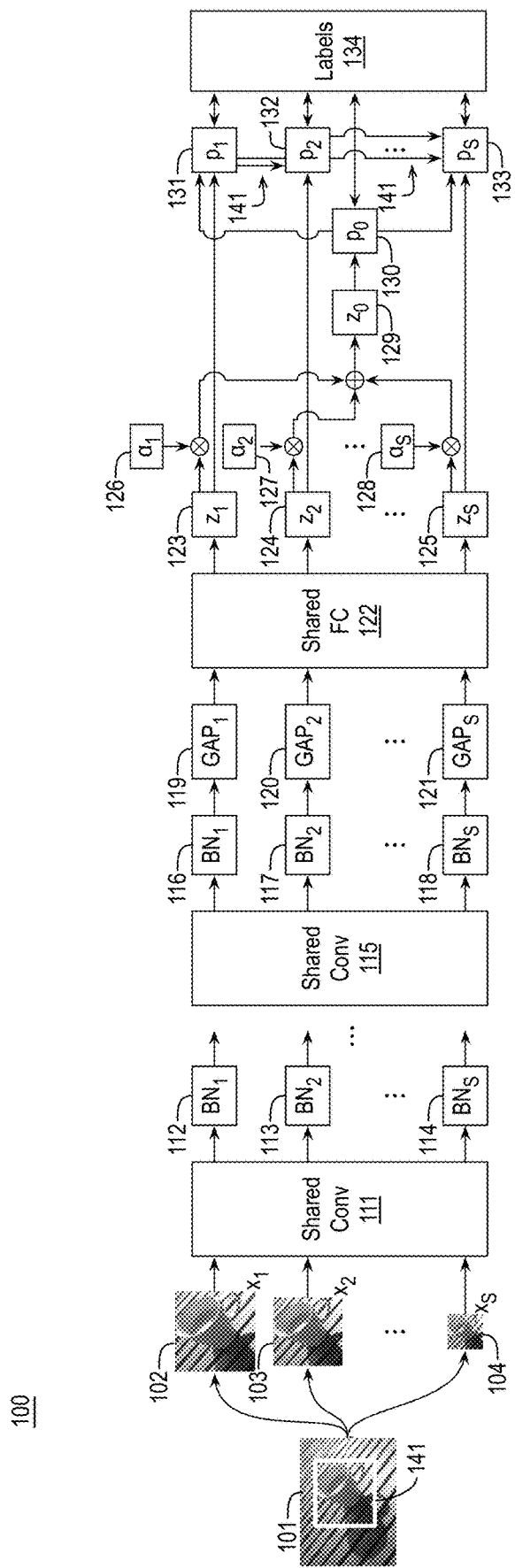
FIG. 1 illustrates an example switchable network to provide object labels for input images of differing resolutions in a network training phase.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to an input image size switchable network for adaptive runtime efficient image classification such that the network applies shared convolutional layer and fully connected layer parameters to all image sizes and unshared normalization parameters based on the input image size being adaptively employed.

As described above, it is desirable to perform image classification or other image processing tasks on input images of differing sizes (e.g., resolutions). As used herein, the term resolution or size, which are used interchangeably, indicate a width by height of an image in pixels with greater resolutions including greater numbers of pixels in the horizontal dimension, vertical dimension, or both. The resultant image classification label or other image processing output may be used in a variety of contexts. Such image classification may include object recognition, identification, or detection. Although discussed herein with respect to image classification for the sake of clarity, the discussed techniques may be used in other image processing contexts such as image super-resolution, image sharpness enhancement, image segmentation, and others In some embodiments, a switchable network has a defined architecture including any number of shared convolutional layers, some or all of which are followed by unshared or exclusive normalization layers. As used herein, the term shared with respect to a convolutional layer, fully connected layer, or other network module indicates the layer or module applies the same (i.e., shared) parameters regardless of the input image size provided to the network. The terms unshared or exclusive, which are used interchangeably, as applied with respect to normalization layers (or its variants like layer normalization, group normalization, and so forth) or other network modules indicate the layer or module applies different (i.e., unshared) parameters based on the input image size provided to the network. For example, first normalization parameters are applied for a first input image resolution and second normalization parameters are applied for a second input image resolution such that the first and second parameters are exclusive (i.e., different) from one another.

Returning to discussion of the switchable network, following application of a last normalization layer (employing parameters depending on input image resolution), an unshared global average pooling layer and subsequent shared fully connected layer may be applied to generate a label or a number of labels (and corresponding probabilities) for the input image. For example, a single label (e.g., cup, dog, etc.) may be output corresponding to a highest probability labels, or some (e.g., the five most likely) or all of the probabilities for each available label may provided as output. The switchable network may include any number of shared convolutional layers, unshared normalization layers, and other layers. In some embodiments, the unshared global average pooling layer and shared fully connected layer may not be employed and feature maps or output images may be provided from the network. Notably, the global average pooling operation outputs a single averaged value over each feature map (e.g., channel, where each pixel/component has the same contribution to the averaged output). From this perspective, it is not shared as the size of the feature map from the last layer varies with respect to different input image.

The switchable network may be employed to handle any number of input image sizes with the shared layers having shared parameters for all input image sizes and exclusive parameters provided for each exclusive layer. For example, given an implementation for five image sizes (e.g., 224×224, 192×192, 160×160, 128×128, and 96×96), each shared layer (e.g., each convolutional layer and a fully connected layer) has a single set of parameters while each unshared layer (e.g., each normalization layer and each global average pooling layer) applies different parameters sets and/or differing operations responsive to the size of the input image. Such techniques save on total storage requirements (as normalization parameters typically account for less than 1% of the total of the network parameters) and latency in switching for input image size.

Furthermore, the switchable network may have any architecture or convolutional neural network (CNN) backbone such that the elements or modules employed utilize, at least in part, shared parameters for convolutional layers and/or a fully connected layer(s) and unshared parameters for normalization layers, a global average pooling layer(s), and/or other layers. As used herein, the term CNN includes any network employing one or more convolutional layers as a part of the network. The term convolutional layer indicates a layer employing a number of convolutional filters and optionally including a RELU layer or a pooling layer. Given the selected switchable network architecture or CNN backbone, a single model is trained that can handle different input image sizes at runtime with improved accuracy as compared to separately trained models. Furthermore, the discussed techniques may be employed in conjunction with other techniques for reduced CNN model size and/or CNN model improvement such as linearly boosting, quantization techniques, and pruning techniques.

FIG. 1 illustrates an example switchable network 100 to provide object labels for input images of differing resolutions in a network training phase, arranged in accordance with at least some implementations of the present disclosure. As shown in FIG. 1, switchable network 100 includes a shared convolutional layer 111, an unshared batch normalization layer employing exclusive batch normalization modules 112, 113, 114, a shared convolutional layer 115, an unshared batch normalization layer employing exclusive batch normalization modules 116, 117, 118, an unshared global average pooling layer employing exclusive global average pooling modules 119, 120, 121, and a shared fully connected layer 122. Such layers and modules are trained, in a network training phase to provide finalized parameters for deployment in a network implementation phase, as discussed with respect to FIG. 3, to generate object labels for input images of differing resolutions. Such training is performed, at least partially based on logits 123, 124, 125, logit importance scores 126, 127, 128, an ensemble logit 129, an ensemble prediction 130, and predictions 131, 132, 133 such that resultant ensemble prediction 130 and predictions 131, 132, 133 are compared to ground truth labels 134. During an implementation phase, such training components are discarded from switchable network 100.

As shown in FIG. 1, any number of shared convolutional layers and corresponding unshared batch normalization layers employing exclusive batch normalization modules may be provided prior to shared convolutional layer 115 and the remainder of switchable network 100. For example, any number of pairings of shared convolutional layers and corresponding unshared batch normalization layers may be included in switchable network 100. Furthermore, the number of convolutional filters, filter sizes, etc. at the convolutional layers as well as the batch normalization techniques may include any suitable characteristics. Although discussed and illustrated with respect to batch normalization in some contexts, alternatively, layer normalization, group normalization, or other normalization processing may be applied using unshared normalization parameters. As used herein, the term normalization indicates any of such processes as performed using corresponding unshared normalization parameters. The unshared global average pooling layer employing exclusive global average pooling modules 119, 120, 121 and shared fully connected layer 122 may have any suitable characteristics. The outputs of shared convolutional layers as well as outputs of a selected batch normalization module and a global average pooling module (e.g., based on image input size) are characterized as feature maps. At each layer, any number of feature maps (i.e., corresponding to the number of convolutional filters) of any resolution may be used. Similarly, the output of shared fully connected layer 122 may be characterized as probabilities or scores or the like and indicate, depending on the output node, the probability or likelihood an input image includes an image of a label assigned to the node. In some embodiments, the sum of probabilities or likelihoods of all nodes sums to one.

Switchable network 100, either in training or in implementation may be implemented via any suitable device such as a personal computer, a laptop computer, a tablet, a phablet, a smart phone, a digital camera, a gaming console, a wearable device, a display device, an all-in-one device, a two-in-one device, or the like. For example, switchable network 100 may provide at least a portion of an image artificial intelligence processing pipeline that may be implemented in hardware, software, or a combination thereof. In some embodiments, switchable network 100 is implemented, in an implementation phase, in hardware as a system-on-a-chip (SoC). In some embodiments, the SoC is employed as a monolithic integrated circuit (IC). As used herein, the term monolithic indicates a device that is discrete from other devices, although it may be coupled to other devices for communication and power supply.

Figure 2:
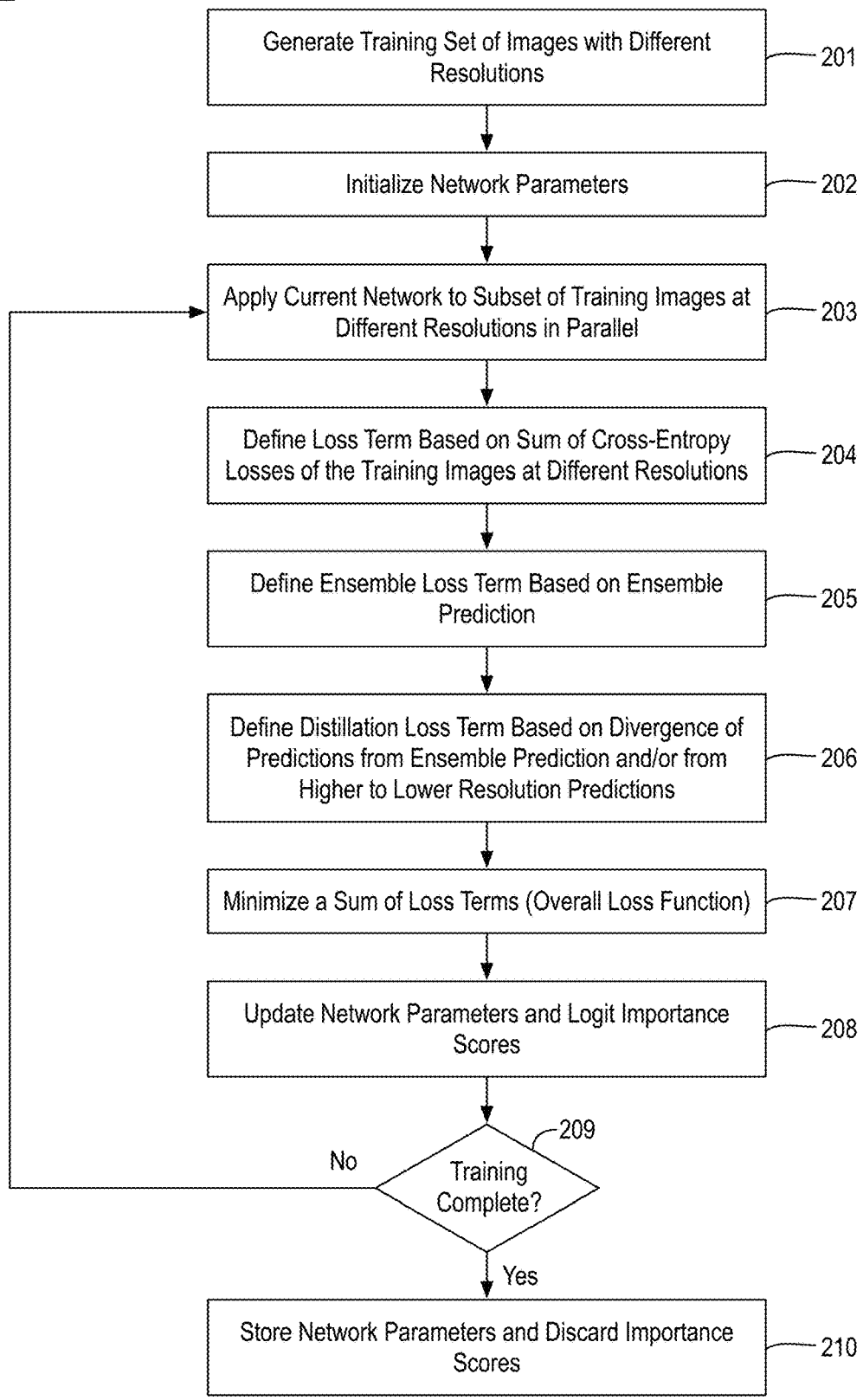
FIG. 2 is a flow diagram illustrating an example process for training a switchable network.

FIG. 2 is a flow diagram illustrating an example process 200 for training a switchable network, arranged in accordance with at least some implementations of the present disclosure. Process 200 may include one or more operations 201-210 as illustrated in FIG. 2. Process 200 or portions thereof may be performed by any device or system discussed herein to train switchable network 100.

The training of switchable network 100 provides a runtime efficient network for switching input image sizes, which may be characterized as an input-size switchable network (IS-Net). Provided any switchable network 100 architecture or CNN backbone, in some embodiments, the training includes three components. First, a mixed-size (i.e., mixed image size) parallel training framework is provided such that input training images with different sizes are trained within a single model. Second, as different training image sizes lead to different activation statistics in a network, to address mixed-size interaction effects (e.g., unbalanced performance) during training, convolutional network parameters are shared but layer-wise normalization parameters are unshared for each input image size. Third, to remove mixed-size interaction effects and boost model performance on different image sizes, a mixed-size ensemble distillation is performed on the fly during training, based on the same image instances with different image sizes (e.g., the same training image content at different resolutions). As used herein, the term image instance indicates a source image of a particular view, object, etc. that is used to generate multiple training images at different resolutions. For example, the multiple training images include the same imagery at different resolutions of a randomly cropped region of the image instance (or of an entirety of the image instance). After the training, the resultant switchable network 100, in implementation, allows switching between different input image sizes and shows improved performance compared to individual models trained with corresponding image sizes.

Process 200 begins at operation 201, where a training set of training images having different resolutions is generated. The training image instances may include any number (e.g., thousands) of image instances (i.e., images) including objects to be detected by the network as well as image instances absent such objects. Furthermore, each training image instance has a corresponding ground truth object label for training of the image. For example, a first training image instance may have an image of a cup and a corresponding ground truth label of 'cup', a second training image instance may have an image of a spoon and a corresponding ground truth label of 'spoon', and so on. Each training image instance is then randomly cropped and the cropped portion is resized to any number of training images corresponding to the training image instance. For example, a training set of images (i.e., image instances) are attained and each image instance or template or the like is cropped and resized to a number of fixed size training images corresponding to the size of images at which the switchable network is to be employed. For example, if the network is to be employed at five image sizes (e.g., 224×224, 192×192, 160×160, 128×128, and 96×96), each cropped portion of a training image instance is resized to those five image sizes to provide five training images and a one corresponding ground truth label.

With reference to FIG. 1, each training image instance 101 may be cropped using bounding box 141 and resized to any number of training images 102, 103, 104 having different resolutions such that training image 102 has a greater resolution than training image 103, training image 103 has a greater resolution than any intervening training images, and so on through a lowest resolution training image 104. For example, as shown, S image resolutions may be implemented with each resolution 1, 2, ..., S decreasing with increasing index value. In some embodiments, each training image instance 101 is cropped and resized to a number (i.e., S), of fix sized samples, $x^i$. In some embodiments, the training set is denoted as $\{(x^i, y^i) | i \in \{1, 2, \ldots, N\}\}$ where $y^i$ is a label that belongs to one of C classes and N is the number of training image instances.

Such training images 102, 103, 104 are provided to switchable network 100. Notably, training image 102 traverses switchable network 100 via application of shared convolutional layer 111 (i.e., shared convolutional layer 111 is applied to any input image regardless of resolution), exclusive batch normalization module 112 (i.e., batch normalization module 112 is only applied to input image having the resolution of batch normalization module 112), any number of shared convolutional layer/exclusive batch normalization module pairs, shared convolutional layer 115, exclusive batch normalization module 116, exclusive global average pooling module 119, and shared fully connected layer 122, the output of which is used to generate a logit 123 and, ultimately a prediction 131. Similarly, training image 103 traverses switchable network 100 via application of shared convolutional layer 111, exclusive batch normalization module 113, any number of shared convolutional layer/exclusive batch normalization module pairs, shared convolutional layer 115, exclusive batch normalization module 117, exclusive global average pooling module 120, and shared fully connected layer 122, the output of which is used to generate a logit 124 and, ultimately a prediction 132, and so on such that, as shown, training image 104 traverses switchable network 100 via application of shared convolutional layer 111, exclusive batch normalization module 114, any number of shared convolutional layer/exclusive batch normalization module pairs, shared convolutional layer 115, exclusive batch normalization module 118, exclusive global average pooling module 121, and shared fully connected layer 122, the output of which is used to generate a logit 125 and, ultimately a prediction 133.

Thereby, during training switchable network 100 is applied to the same training image instance 101 at multiple resolutions as shown via training images 102, 103, 104 to generate differing resultant outcomes. Such resultant outcomes for differing resolutions of the same training image instances are leveraged for improved training of switchable network 100.

Returning to FIG. 2, processing continues at operation 202, where, given a network configuration (e.g., a network architecture or CNN backbone) such as switchable network 100 with parameters θ, the network is initialized for training. The network parameters may be initialized using any suitable technique or techniques such as randomization within particular ranges or the like.

In general, given network parameters, θ, the predicted probability of the class c is denoted as $p(c|x^i,\theta)$. In training, a network (e.g., a network model) may be optimized with cross-entropy loss as shown in Equation (1):

$$\mathcal{H}(x, y) = -\frac{1}{N}\sum_{i=1}^{N}\sum_{c=1}^{C}\delta(c, y^i)\log(p(c|x^i, \theta)),  \quad (1)$$

where $\delta(c,y^i)$ equals 1 when $c=y^i$ and otherwise equals 0.

In some embodiments, a mixed-size parallel training framework is employed to train switchable network 100. As discussed, each training image instance is cropped and resized (e.g., randomly cropped and resized to a resolution to be implemented by switchable network 100). Assuming S image sizes, which may be any suitable value such as 4, 5, or more (e.g., S={224×224, 192×192, 160×160, 128×128, and 96×96}), the mixed-size training set can be characterized as shown in Expression (2):

$$\{(x_1^i, x_2^i, \ldots, x_S^i, y^i)|i \in \{1,2,\ldots,N\}\} \quad (2)$$

where each training image instance, $x^i$, is sized to each available image size (e.g., 1, 2, . . . , S) and a group of resized training images of differing resolutions has a corresponding ground truth label, $y^i$.

Processing continues at operation 203, where the network (at a first or subsequent training iteration) is applied to at least a subset of training image instances. That is, the network, based on current network parameters is applied to sets of training images at different resolutions such that each set corresponds to an image instance and has a corresponding ground truth label. Thereby, mixed size parallel training of switchable network 100 is performed. For example, at operation 203, for any number of image instances, the network is applied to each image resolution of the image instance in parallel and the resultant output for each of the resolutions is used to adjust the parameters of switchable network 100. Notably, at each training iteration, the network is applied, loss terms are defined, parameters are adjusted and so on until training is complete. Such training iterations may be applied to all training images or only some of them in batches or the like. For example, such training iterations may use the same training images for a particular number of iterations, change training images or batches thereof, and so on, returning to such training images or batches as training progresses. In any event, switchable network 100 is applied to training images of multiple resolutions in parallel, loss terms are defined and evaluated, the parameters are adjusted, the loss terms are evaluated, and so on until convergence (e.g., an error below a target or a particular number of training iterations or epochs is attained).

In some embodiments, with reference to FIG. 1, shared convolutional layer parameters for shared convolutional layers 111, 115 (and any additional convolutional layers), unshared batch normalization parameters for each of batch normalization modules 112, 113, 114, 116, 117, 118 (and any additional unshared batch normalization modules), unshared global average pooling parameters for each of global average pooling modules 119, 120, 121, and shared fully connected layer parameters for shared fully connected layer 122 are, taken together, pre-trained convolutional neural network parameters, θ, trained as discussed with respect to FIG. 2.

Processing continues at operation 204, where a loss term based on a sum of cross-entropy losses of predictions generated using the training images at differing resolutions is defined and evaluated. In some embodiments, the loss term (or function) of mixed-size training to be optimized (in part) is defined as shown below. For example, a loss function may include one or more loss terms such that the loss function (e.g., overall loss function) is minimized over iterations to train the network. Herein, each loss term may be used independently to train a network or in combination with other loss terms. In some embodiments, a classification loss term is defined as a summation of the cross-entropy losses as shown in Equation (3):

$$\mathcal{L}_{cls} = \sum_{s=1}^{S}\mathcal{H}(x_s, y). \quad (3)$$

where $\mathcal{L}_{cls}$ is the classification loss term, which sums losses across each image size (resolution) for the cross entropy loss as defined in Equation (1). As shown, all image sizes (i.e., 1, 2, . . . , S) contribute equally to the joint objective of minimizing a final single model. For example, as shown in FIG. 1, prediction 131, $p_1$, corresponding to input training image 102 is compared to the corresponding ground truth label (i.e., using cross-entropy loss techniques), prediction 132, $p_2$, corresponding to input training image 103 is compared to the corresponding ground truth label, and so on, with prediction 133, $p_S$, corresponding to input training image 104 is compared to the corresponding ground truth label. Such cross-entropy losses are summed across all available resolutions to provide mixed-size parallel training.

As discussed below, the network parameters are updated and refined in process 200 and eventually deployed. Notably, the loss term or function as shown with respect to Equation (3) may be minimized as part of the training. As discussed, switchable network 100 may have any suitable architecture inclusive of convolutional layers (conv) layers/blocks, batch normalization layers, a global average pooling layer, and a fully connected (FC) layer. In some embodiments, when input images have different sizes, the corresponding feature maps from all convolutional layers will also vary in spatial sizes. Due to the global average pooling layer, features are transformed to a unified spatial dimension (e.g., 1×1) with an equal number of channels, making it possible to be followed by a shared fully connected layer 122.

During the discussed parallel training, parameters of shared convolutional layers 111, 115 and shared fully connected layer 122 are, as discussed, shared and applied regardless of input image size. Thereby, the training for multiple image sizes is realized in a single network. Furthermore, resizing image results in different activation statistics in a network, including means and variances (e.g., parameters) used in batch normalization (BN) and its variants. During mixed-size parallel training, such batch normalization parameters are unshared or exclusive (or privatized) for each image size.

Therefore, at a training iteration of switchable network 100, the pre-trained convolutional neural network parameters are adjusted (or updated) in parallel, in some embodiments, using an overall loss (as discussed further below) that includes a classification loss term ($\mathcal{L}_{cls}$) as defined in Equation (3) that includes a sum of cross entropy losses ($\mathcal{H}$) using training images at the first resolution and the second resolution in parallel. In some embodiments, the classification loss term ($\mathcal{L}_{cls}$) alone may be used to train switchable network 100.

Furthermore, in the training of switchable network 100, the mixed-size based transformation (e.g., adjustment of parameters) may be viewed as data augmentation. As such, first, as the model is trained based on a wider range of image sizes (relative to training using only one image size), with the setting of image sizes being diverse, the mixed-size parallel training tends to bring accuracy gains to larger image sizes (encoding richer information) rather than smaller image sizes. Second, based on the specialty of the large-scale image classification, where the objects of interest randomly occupy different portions of image areas, the random-size crop augmentation strategy is used during training but cannot be used for testing. This tends to make the final model bias towards better performance for large image sizes while displaying worse performance on much smaller image sizes.

To address such concerns, mixed-size ensemble distillation (MED) techniques are employed during training. Notably, for a well-trained model, an image instance tested at a larger input image size does not always correspond to a better prediction as compared to a smaller input image size for the same image instance. For example, testing has indicated that there always exists a proportion of samples that are correctly classified at a small image size but wrongly classified at another larger image size. Such results indicate that model predictions at different image sizes are complementary, and the larger image size is not always better. Therefore, an on-the-fly teacher (e.g., generated at a training iteration) is employed for training switchable network 100 such that the teacher is an ensemble of the predictions with respect to all image sizes. Furthermore, a dense ensemble knowledge distillation is performed in training to improve the overall performance switchable network 100.

Processing continues at operation 205, where an ensemble prediction is defined and, using the ensemble prediction, an ensemble loss term is defined. Notably, with reference to FIG. 1, for training image instance 101, multiple predictions are attained, each corresponding to one of training images 102, 103, 104. An ensemble prediction, which is a weighted average of the multiple predictions (e.g., weighted using logit importance scores as discussed below), is determined and used as an on-the-fly teacher for each of the multiple predictions. Notably, the weighted average ensemble prediction is generated via switchable network 100 on-the-fly during training (and is not imposed by another network). The ensemble prediction is then used to train the network using the divergence of each of the multiple predictions from the ensemble prediction. As used herein, the term ensemble indicates an entity determined from a group such that the group may be viewed as a whole rather than individually.

In some embodiments, during the training process of image classification, for each input image $x^i$, the probability of the class c is determined using a softmax function as shown in Equation (4):

$$p(c|x^i, \theta) = p(c|z^i) = \frac{\exp(z_c^i)}{\sum_{j=1}^{C} \exp(z_j^i)}, c \in \{1, 2, \ldots, C\}, \quad (4)$$

where $z^i$ is a logit, the un-normalized log probability outputted by the network, and probabilities over all classes can be denoted as the model prediction p.

As discussed, each image instance is resized to S sizes during training. Then, S corresponding logits ($z_1, z_2, \ldots, z_S$) are generated in accordance with Equation (4). Exemplary logits 123, 124, 125 are illustrated in FIG. 1. With continued reference to FIG. 1, a group of importance scores 126, 127, 128, $\alpha = [\alpha_1, \alpha_2, \ldots \alpha_S]$ satisfying $\alpha \geq 0$, $\sum_{s=1}^{S} \alpha_s = 1$ are learned via implementation of a softmax function. An ensemble logit 129, $z_0$, is then generated via a weighted summation of the S logits weighted using the importance scores as shown in Equation (5):

$$z_0 = \sum_{s=1}^{S} \alpha_s z_s. \quad (5)$$

where $z_0$ is ensemble logit 129, which is a weighted average of logits 123, 124, 125 corresponding to the pre-trained convolutional neural network parameters as applied to each of training images 102, 103, 104 weighted using logit importance scores 126, 127, 128. In some embodiments, when optimizing a, the gradients of logits ($z_1, z_2, \ldots, z_S$) are temporarily frozen.

Using ensemble logit 129, $z_0$, a corresponding prediction, $p_0$, characterized as an ensemble prediction 130 is determined using Equation (4) as discussed above. Notably, ensemble prediction 130, $p_0$, is a combination of predictions from application of switchable network 100 (using current parameters) to training images 102, 103, 104. Importance scores 126, 127, 128, $\alpha$, are optimized using a cross-entropy loss between ensemble prediction 130, $p_0$, and the labels given with respect to the training set. The cross-entropy loss is characterized as an ensemble loss term, $\mathcal{L}_{ens}$, and is determined as shown with respect to Equation (6):

$$\mathcal{L}_{ens} = -\frac{1}{N}\sum_{i=1}^{N}\sum_{c=1}^{C}\delta(c, y^i)\log(p(c|z_0^i)). \quad (6)$$

For example, a loss function may include one or more loss terms such that the loss function (e.g., overall loss function) is minimized over iterations to train the network. For example, ensemble loss term, $\mathcal{L}_{ens}$, may be used as part of a loss function as discussed below. As shown, minimization of ensemble loss term, $\mathcal{L}_{ens}$, minimizes the divergence of the ensemble prediction from the ground truth provided in the training.

Processing continues at operation 206, where a distillation loss term is defined based on divergences of predictions from the ensemble prediction generated at operation 205 and/or divergences of predictions from predictions made using larger input training images. With reference to FIG. 1, for training image instance 101, multiple predictions are attained, each corresponding to one of training images 102, 103, 104. Ensemble prediction 130, which is a weighted average of the multiple predictions (e.g., weighted using logit importance scores as discussed below), is determined as discussed. As shown, ensemble prediction 130 is compared to the ground truth as provided by ground truth labels 134 (e.g., using cross-entropy techniques) and the difference therebetween is minimized as shown with respect to Equation (6).

Ensemble prediction 130 may also be used as an on-the-fly teacher for each of the multiple predictions as shown in FIG. 1. For example, using logits 123, 124, 125, corresponding predictions 131, 132, 133 are generated, which correspond to input training images 102, 103, 104, respectively. As shown, the divergence of ensemble prediction 130 from each of predictions 131, 132, 133 are used in the training of switchable network 100. Notably, the weighted average ensemble prediction is generated via switchable network 100 on-the-fly during training (and is not imposed by another network). Ensemble prediction 130 is then used to train the network using the divergence of each of the multiple predictions 131, 132, 133 from Ensemble prediction 130. As used herein, the term ensemble indicates an entity determined from a group such that the group may be viewed as a whole rather than individually.

In addition or in the alternative, predictions of higher resolution training images may be used as reference for training lower resolution training images as shown with respect to cascade 141. For example, prediction 131 (corresponding to a highest resolution input training image 102) may be used to train predictions 132, . . . , 133 at all lower resolutions, prediction 132 (corresponding to a second highest resolution input training image 102) may be used to train predictions at all lower resolutions including prediction 133, and so (such that only prediction 133 is not used as a reference). Such techniques may leverage higher resolution input training images typically providing better predictions.

For example, in addition or in the alternative to training via minimization (in part) of the ensemble loss term (e.g., the divergence of the ensemble prediction from ground truth), ensemble prediction 130 may be used as an on-the-fly teacher for the other predictions made for training images 102, 103, 104 (i.e., training images at differing resolutions). In some embodiments, a distillation loss term is defined to seek to minimize the divergence of each prediction from the ensemble loss prediction.

That is, in some embodiments, in the training of switchable network 100, predictions at different image sizes are forced to mimic the learned ensemble prediction 130. In some embodiments, a distillation loss, $\mathcal{L}_{dis}$, is determined as a summation of Kullback-Leibler (KL) divergences as shown in Equation (7):

$$\mathcal{L}_{dis} = \sum_{s=1}^{S}\mathcal{D}_{kl}(p_0\|p_s). \quad (7)$$

In some embodiments, to define the distillation loss (e.g., in the knowledge distillation process), to quantify the alignment between a teacher prediction, $p_t$, and a student prediction, $p_s$, Equation (8) is used:

$$\mathcal{D}_{kl}(p_t\|p_s) = \frac{1}{N}\sum_{i=1}^{N}\sum_{c=1}^{C}p(c|z_t^i)\log\frac{p(c|z_t^i)}{p(c|z_s^i)}. \quad (8)$$

such that $p_t$ is representative of ensemble prediction 130 and $p_s$ is representative of each predictions 131, 132, 133.

In addition or in the alternative, as discussed, under the mixed size parallel training framework, the accuracy of a prediction at a large input training image size is often better than the accuracy of a prediction at a smaller input training image size. In some embodiments, accuracies can be further improved by offering dense guidance from predications at large image sizes toward predictions at smaller image sizes. In some embodiments, the distillation loss, $\mathcal{L}_{dis}$, may be generalized as shown in Equation (9):

$$\mathcal{L}_{dis} = \frac{2}{S+1}\sum_{t=0}^{S-1}\sum_{s=t+1}^{S}\mathcal{D}_{kl}(p_t\|p_s), \quad (9)$$

where the index t starts from 0 referring to the ensemble term. For example, Equation (9) sums divergences of ensemble prediction 130 from each of predictions 131, 132, . . . , 133, divergences of prediction 131, from each of predictions 132, . . . , 133, and so on such that, in some embodiments, the distillation loss, $\mathcal{L}_{dis}$, is the sum of the divergences of an ensemble prediction from each image size based prediction and the divergences of each image size from each image size based prediction from each image size based prediction having a smaller resolution. The term each image size based prediction indicates a prediction generated by application of current switchable network parameters to an input training image.

Processing continues at operation 206, where a loss function (i.e., an overall loss function) including a sum of loss terms is minimized. The overall loss function may include one or more of any loss terms discussed herein. In some embodiments, the overall loss function is a summation of the classification loss term, the ensemble loss term, and the distillation loss term, without any extra weighted parameters to be tuned as shown in Equation (10):

$$\mathcal{L} = \mathcal{L}_{cls} + \mathcal{L}_{ens} + \mathcal{L}_{dis}, \quad (10)$$

where optimizing the ensemble loss, $\mathcal{L}_{ens}$, only updates importance scores 126, 127, 128, α, with all network weights frozen. Notably, the distillation loss term may include only divergences of predictions 131, 132, 133 from ensemble prediction 130 or it may include divergences of predictions 131, 132, 133 from ensemble prediction 130 and divergences of each of predictions 131, 132 from those predictions at higher resolutions.

Processing continues at operation 208, where the switchable network parameters, θ, and logit importance scores, α, are updated based on minimizing the defined overall loss function with respect to the switchable network parameters, θ. Processing continues at decision operation 209, where a determination is made as to whether training of the switchable network is complete. Such a determination may be made using any suitable technique or techniques such as comparison of overall loss to a threshold, performance of a particular number of training iterations, or the like.

If training is not complete, processing continues at operation 203 as discussed above until training is complete. When training is complete, processing continues at operation 210 where the switchable network parameters, θ, are stored to memory for eventual deployment in an implementation phase as discussed herein. Furthermore, logit importance scores are discarded as not needed in implementation.

Figure 3:
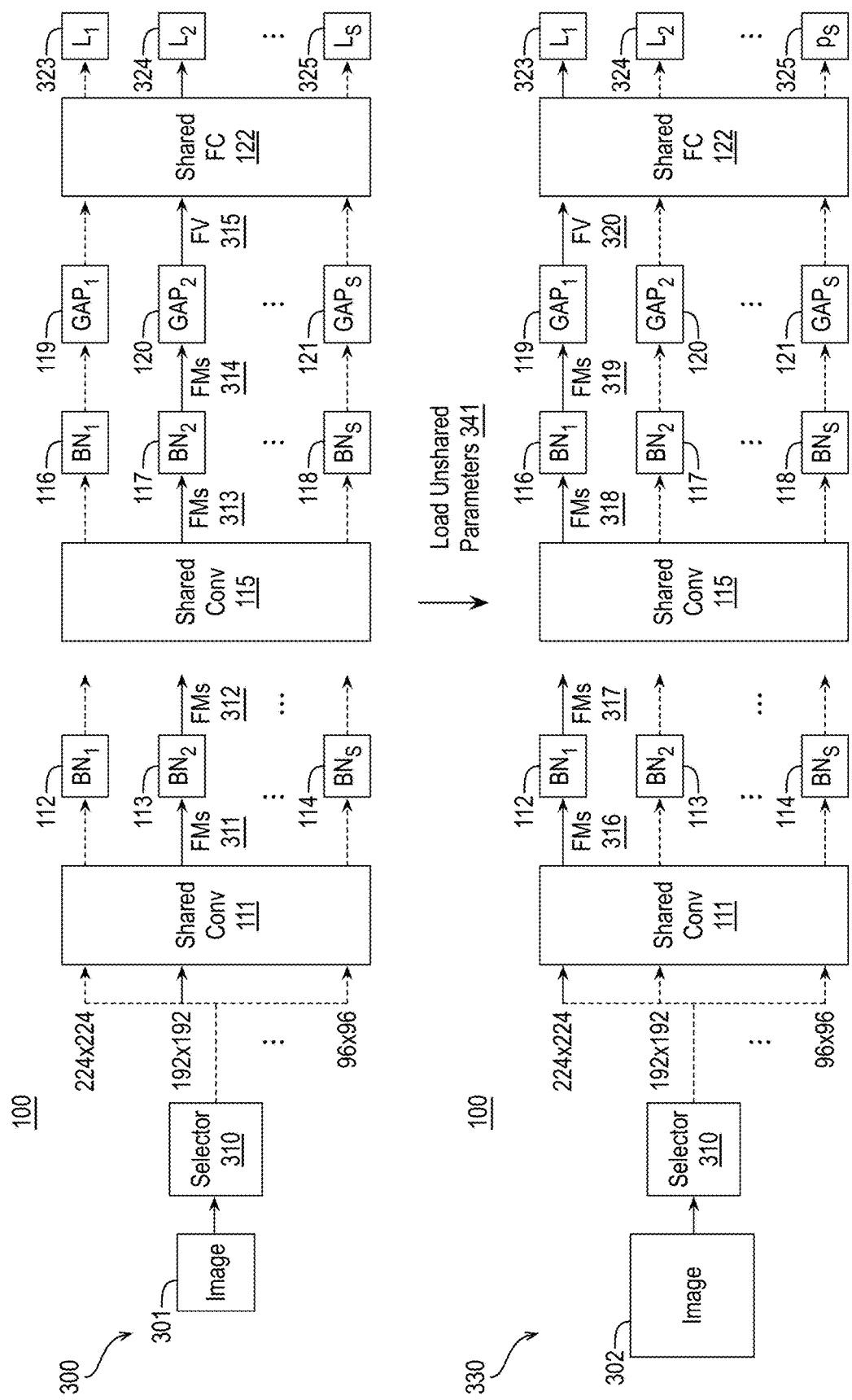
FIG. 3 illustrates an example switchable network in an implementation phase to provide object labels for input images of differing resolutions.

FIG. 3 illustrates switchable network 100 in an implementation phase to provide object labels for input images of differing resolutions, arranged in accordance with at least some implementations of the present disclosure. As shown in FIG. 3, switchable network 100 is implemented at a first time instance 300 with an input image 301 at a first resolution and at a second time instance 330 with a input image 302 at a second resolution that is greater than the first resolution. As discussed, in the implementation phase, switchable network 100 may be implemented via any suitable device such as a personal computer, a laptop computer, a tablet, a phablet, a smart phone, a digital camera, a gaming console, a wearable device, a display device, an all-in-one device, a two-in-one device, or the like. For example, network parameters of switchable network 100 may be retrieved from memory and implemented via one or more processors.

Notably, between first time instance 300 and second time instance 330, only unshared parameters 341 such as those for batch normalization modules and global average pooling need to be updated for processing to switch from processing input image 301 to input image 302. For example, parameters needed only for training may be discarded. Furthermore, as shown, components needed for training are also discarded in the implementation phase and a selector 310 is added.

At first time instance 300, input image 301 is received. Input image 301 may include 3 image channels such as RGB channels, YUV channels, or the like or a single luma channel. Input image 301 may have any suitable resolution such as one of 224×224 pixels, 192×192 pixels, 160×160 pixels, 128×128 pixels, or 96×96 pixels. Selector 310 receives input image 301 or an indicator thereof and selector 310 selects a route or portion of switchable network 100 for implementation based on the resolution of input image 301. In the illustrated example, input image 301 is 192×192 and the selected route through switchable network 100 for input image 301 is as follows: shared convolutional layer 111, batch normalization module 113, any number of shared convolutional layer/unshared batch normalization module pairs, shared convolutional layer 115, batch normalization module 117, global average pooling module 120, fully connected layer 122, which outputs a label or labels 324.

Notably, each of such layers or modules applies parameters of switchable network 100 with the shared layers applying the same parameters regardless of the resolution of the input image and exclusive or unshared modules applying different parameters based on the resolution of the input image. For example, batch normalization module 113 applies parameters exclusive to those of batch normalization modules 112, 114. As used herein, the term exclusive with respect to switchable network parameters indicates a different set of parameters are employed although some parameters match. For example, one or more differing parameters indicates switchable network parameters that are exclusive with respect to each other are applied via the modules. In some embodiments, batch normalization modules apply differing means and variances with respect to one another in response to the resolution of the input image.

As shown, selector 310 provides a route through switchable network 100 for input image 301. Input image 301 is received by shared convolutional layer 111, which applies convolutional layer parameters of shared convolutional layer 111 to input image 301 to generate feature maps (FMs) 311. Feature maps 311 may include any number of feature maps corresponding to a number of convolutional kernels applied at shared convolutional layer 111 having any suitable resolution. Shared convolutional layer 111 may apply convolutional kernels as well as rectified linear units (ReLU) and/or and any other suitable processing. The convolutional layer parameters may include any suitable parameters for the implementation of shared convolutional layer 111 such as filter weights, ReLU parameters, and the like.

Feature maps 311 are selectively received by batch normalization module 113, which applies batch normalization to generate feature maps 312. Feature maps 312 may include any number of feature maps such as the same number of feature maps and resolution of those of feature maps 311. As discussed, batch normalization module 113 applies unshared or exclusive batch normalization parameters such as means and variances, mean parameters, variance parameters, or the like.

Feature maps 312 are processed by any number of shared convolutional layer and unshared batch normalization module pairs in a similar manner to that discussed with respect to shared convolutional layer 111 and batch normalization module 113. Such feature maps (or feature maps 312) are received by shared convolutional layer 115, which applies convolutional layer parameters of shared convolutional layer 115 to generate feature maps 313 having any suitable number of maps and resolutions. Feature maps 313 are selectively received by batch normalization module 117, which applies batch normalization to generate feature maps 314 again having any suitable number of maps and resolutions.

Feature maps 314 are selectively received by global average pooling module 120, which applies global average pooling to generate a feature vector (FV) 315 using any suitable technique or techniques such as a transformation of feature maps 314 to a unified spatial dimension (e.g., 1×1) with an equal number of channels to provide feature vector 315. Feature vector 315 is received by shared fully connected layer 122, which applies fully connected layer parameters of shared fully connected layer 122 to generate a label or labels 324. In some embodiments, switchable network 100 outputs a single label corresponding to a highest probability. In some embodiments, the output includes a number of labels and their corresponding probabilities. In some embodiments, the output includes the probabilities of all possible labels. The output label(s) may be used in a wide array of artificial intelligence, image processing, or similar applications. Although discussed with respect to generation of labels, in some embodiments, switchable network 100 may output feature maps including a super-resolution version of input image 301, a segmentation of input image 301, a sharpness enhanced version of input image 301, or any other imagery.

As shown with respect to time instance 330, switchable network 100 may then be switched to process input image 302 having a different resolution (a higher resolution in the illustrated example) than input image 301. Notably, only unshared parameters 341, which are a small fraction of the total parameters (e.g., <1%), such as those for batch normalization modules and global average pooling need to be updated to switch between processing at differing resolutions. Thereby, switchable network 100 provides a drastically reduced memory footprint as compared to implementing different networks for each available resolution. Any number of resolutions may be handled by switchable network 100 such as 3, 4, 5, 6, or more. In some embodiments, switchable network 100 may process 5 resolutions: 224×224 pixels, 192×192 pixels, 160×160 pixels, 128×128 pixels, or 96×96 pixels.

At second time instance 330, input image 302 is received. As with input image 301, input image 302 may include 3 image channels or a single luma channel. Input image 301 may have any suitable resolution such as one of 224×224 pixels, 192×192 pixels, 160×160 pixels, 128×128 pixels, or 96×96 pixels. In the illustrated example, input image has a resolution of 224×224. Selector 310 selects a route or portion of switchable network 100 for implementation based on the resolution of input image 301 with the selected route in the illustrated example including shared convolutional layer 111, batch normalization module 112, any number of shared convolutional layer/unshared batch normalization module pairs, shared convolutional layer 115, batch normalization module 116, global average pooling module 119, fully connected layer 122, which outputs a label or labels 323. Notably, regardless of input image resolution, the selected route includes shared convolutional layer, any number of shared convolutional layers, shared convolutional layer 115, and fully connected layer 122. As discussed, each of the selected layers or modules applies parameters of switchable network 100 with the shared layers applying the same parameters regardless of the resolution of the input image and exclusive or unshared modules applying different parameters based on the resolution of the input image.

As shown, selector 310 routes input image 302 to shared convolutional layer 111, which applies the convolutional layer parameters of shared convolutional layer 111 (i.e., the same as those applied to any input image including input image 301) to input image 302 to generate feature maps 316. Feature maps 316 are selectively received by batch normalization module 112, which applies batch normalization (i.e., differing batch normalization with respect to other batch normalization modules) to generate feature maps 317. Feature maps 317 may include any number of feature maps such as the same number of feature maps and resolution of those of feature maps 316. Batch normalization module 112 applies unshared or exclusive batch normalization parameters such as means and variances, mean parameters, variance parameters, or the like. Notably, the batch normalization parameters applied by batch normalization module 112 differ with those applied by batch normalization module 113.

Feature maps 317 are processed by any number of shared convolutional layer and unshared batch normalization module pairs in a similar manner and such feature maps (or feature maps 317) are received by shared convolutional layer 115. Shared convolutional layer 115 applies the same convolutional layer parameters as applied with respect to the discussion of input image 301 to generate feature maps 318, which have any suitable number of maps and resolutions. Feature maps 318 are selectively received by batch normalization module 116, which applies batch normalization to generate feature maps 319 again having any suitable number of maps and resolutions. Batch normalization module 116 applies different batch normalization parameters with respect to those applied by batch normalization module 117.

Feature maps 319 are selectively received by global average pooling module 119, which applies global average pooling to generate a feature vector 320. For example, global average pooling module 119 may transform feature maps 319 to a unified spatial dimension with an equal number of channels to provide feature vector 320, which is received by shared fully connected layer 122. Fully connected layer 122 applies fully connected layer parameters of shared fully connected layer 122 (i.e., the same parameters applied to feature vector 315) to generate a label or labels 323, which may have any characteristics as those discussed with respect to label or labels 324. Furthermore, as discussed, although discussed with respect to generation of labels, in some embodiments, switchable network 100 may output feature maps such as a super-resolution image, a segmentation image, a sharpness enhanced image 301, etc.

Figure 4:
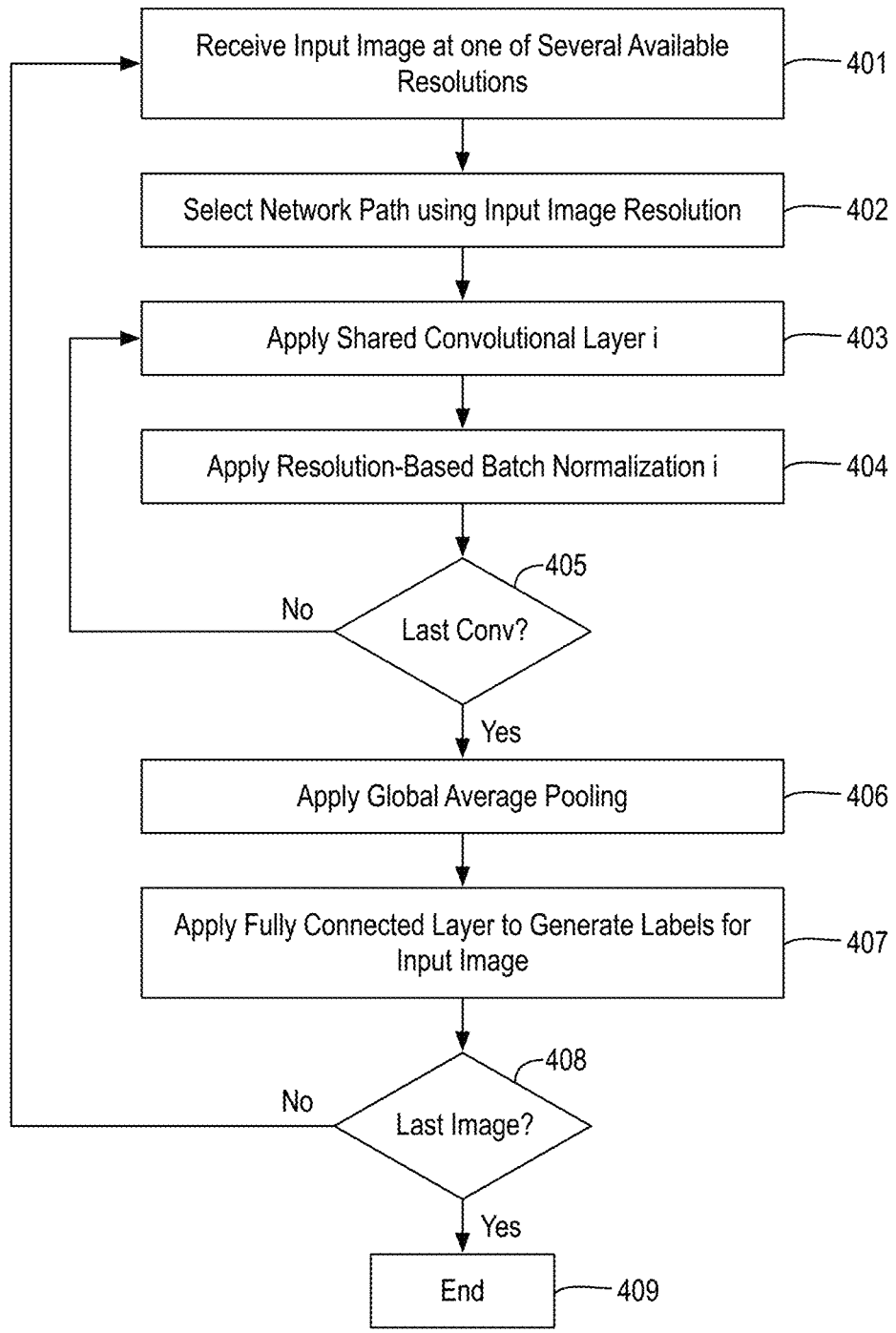
FIG. 4 is a flow diagram illustrating an example process for generating labels for input images of varying resolutions using a switchable network.

FIG. 4 is a flow diagram illustrating an example process 400 for generating labels for input images of varying resolutions using a switchable network, arranged in accordance with at least some implementations of the present disclosure. Process 400 may include one or more operations 401-409 as illustrated in FIG. 4. Process 400 or portions thereof may be performed by any device or system discussed herein such as switchable network 100.

Process 400 begins at operation 401, where an input image is received for processing via a switchable network to provide one or more image classification labels for the input image. The input image may be received at or cropped and resized to one of several input image resolutions that the switchable network is capable of processing. For example, if larger than a largest image size that the switchable network can process, the input image may be downsampled to the largest image size the switchable network is capable of processing. Alternatively, the input image may be upsampled to a smallest image size the switchable network is capable of processing. Furthermore, if the input image is not a proper shape (e.g., square), the input image may be cropped to the proper shape.

Processing continues at operation 402, where a switchable network path is selected using the incoming input image resolution. For example, the switchable network path may always include shared layers, blocks, or modules, while unshared or exclusive layers, blocks, or modules selected in the path are dependent on the resolution of the input image. In some embodiments, all convolutional layers are shared, a fully connected layer is shared while batch normalization modules and global averaging pooling modules are unshared or exclusive. The number of available paths through the switchable network equals the number of resolutions the switchable network can process and may be any number such as 3, 4, 5, 6, or more. In some embodiments, the switchable network has five paths, one each for 224×224, 192×192, 160×160, 128×128, and 96×96 resolution input images.

Processing continues at operation 403, where a first shared convolutional layer is applied to the input image. The shared convolutional layer may have any characteristics discussed herein such that the shared convolutional layer applies, regardless of input image resolution, the same convolutional layer parameters to the input image to generate any number of feature maps. Processing continues at operation 404, where a resolution based batch normalization is applied to the resultant feature maps. That is, batch normalization parameters are selected based on the resolution of the input image and are exclusive to batch normalization parameters for other resolutions. Such batch normalization generates feature maps altered with respect to the incoming feature maps.

Processing continues at decision operation 405, where a determination is made as to whether the shared convolutional layer applied at operation 403 is the last shared convolutional layer in the switchable network. If not, processing continues at operations 403, 404 as discussed above with the feature maps output from the batch normalization performed at operation 404 providing the input to the next shared convolutional layer (e.g., as counted by counter variable i). Each pertinent shared convolutional layer in the sequence is applied to the input image (the first shared convolutional layer) or feature maps (each subsequent shared convolutional layer). Furthermore, at operation 404, a subsequent a resolution adaptive batch normalization is applied to the resultant feature maps with the batch normalization parameters again being selected based on the resolution of the input image and exclusive to batch normalization parameters for other resolutions.

When the shared convolutional layer applied at operation 403 is the last shared convolutional layer in the switchable network (and the a resolution based batch normalization applied at operation 404 is the last resolution based batch normalization in the switchable network), processing continues at operation 406, where a resolution based global average pooling is applied to the resultant feature maps. For example, global average pooling parameters are selected based on the resolution of the input image and are exclusive to global average pooling parameters for other resolutions. Such global average pooling processing provides a feature vector for implementation via a fully connected layer.

Processing continues at operation 407, where a shared fully connected layer is applied to the input image. The shared fully connected layer may have any characteristics discussed herein such that the shared fully connected layer applies, regardless of input image resolution, the same shared fully connected layer parameters to the input vector to generate one or more image classification labels corresponding to the input image. A single label, a number of highest probability labels, or the like may be provided as output.

Processing continues at decision operation 408, where a determination is made as to whether a last image has been processed. If so, processing ends at end operation 409. If not, processing continues at operation 401 as discussed above. Notably, if the next image has the same resolution as the previously processed image, the network path selected at operation 402 is the same and no change in parameters (e.g., in cache memory or the like for implementation by a processor) is needed. However, if the next image has a different resolution with respect to the previously processed image, only unshared or exclusive parameters need to be discarded and reloaded to process the next image. For example, the shared parameters may be maintained in high level cache (e.g., L1 or L2 cache) or on board memory while unshared parameters are retrieved from a lower level cache (e.g., L3 cache) or main memory. In some embodiments, the shared parameters are maintained in on chip memory (e.g., L1 cache) while unshared parameters are retrieved from off chip memory and loaded to on chip memory for processing of the next image.

Such processing may be repeated any number of times to quickly change between image resolutions for image classification. Such techniques provide input image-size switchable network for adaptive runtime efficient image classification.

Figure 5:
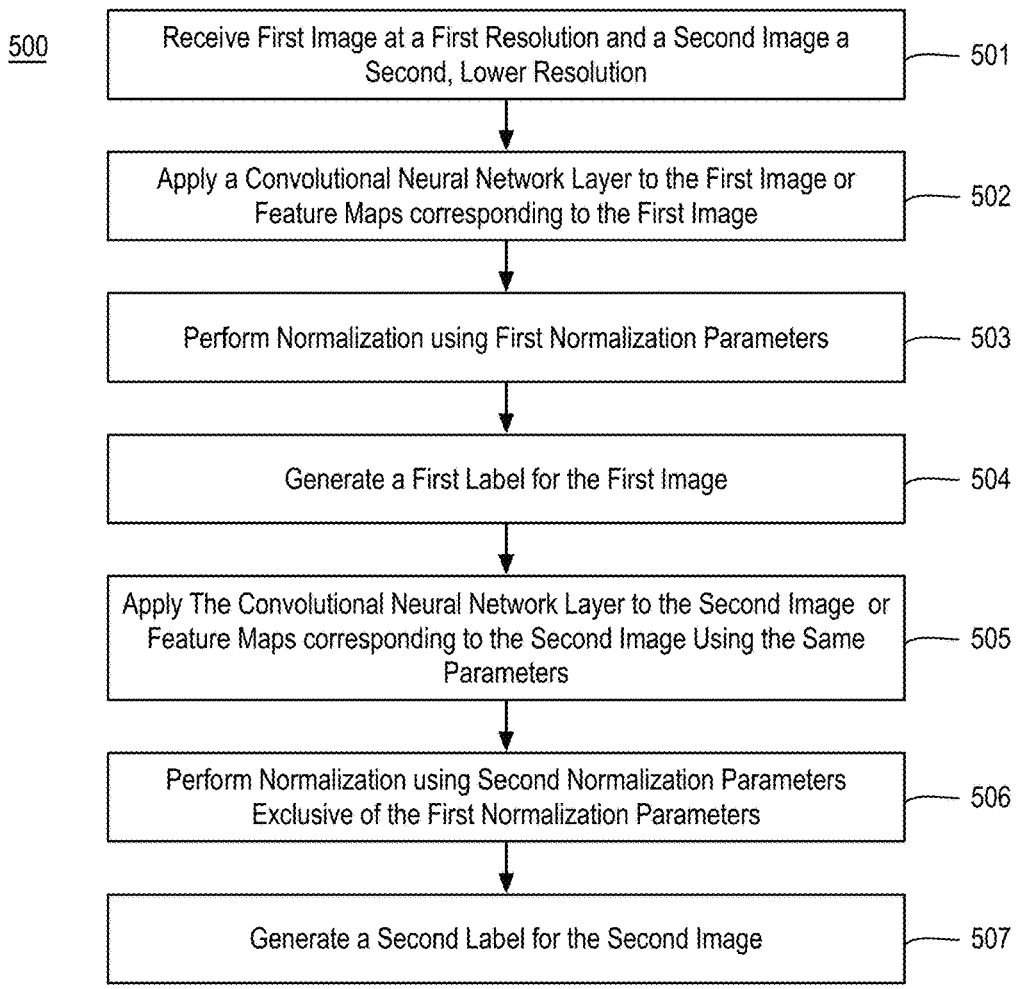
FIG. 5 is a flow diagram illustrating an example process for performing image classification.

FIG. 5 is a flow diagram illustrating an example process 500 for performing image classification, arranged in accordance with at least some implementations of the present disclosure. Process 500 may include one or more operations 501-507 as illustrated in FIG. 5. Process 500 may form at least part of an image classification process. By way of non-limiting example, process 500 may form at least part of an image classification process performed by switchable network 100 in an implementation phase as discussed herein. Furthermore, process 500 will be described herein with reference to system 600 of FIG. 6.

Figure 6:
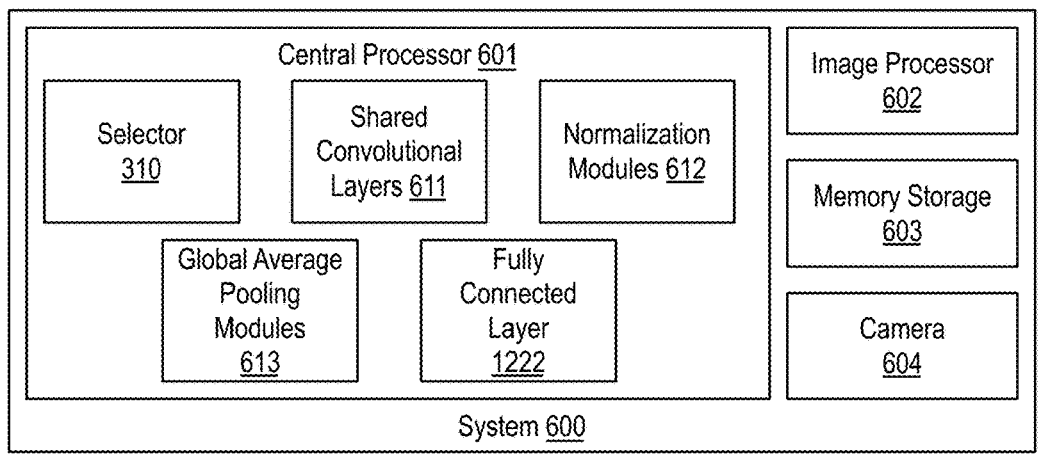
FIG. 6 is an illustrative diagram of an example system for performing image classification.

FIG. 6 is an illustrative diagram of an example system 600 for performing image classification, arranged in accordance with at least some implementations of the present disclosure. As shown in FIG. 6, system 600 may include a central processor 601, an image processor 602, a memory storage 603, and a camera 604. For example, camera 604 may acquire input images for processing. Also as shown, central processor 601 may include or implement selector 310, shared convolutional layers 611 (representative of shared convolutional layers 111, 115, etc.), normalization modules 612 (representative of batch normalization modules 112, 113, 114, 116, 117, 118, etc.), global average pooling modules 613 (representative of global average pooling modules 119, 120, 121), and fully connected layer 122. System 600 may also include or implement any training modules or components as discussed with respect to FIG. 1. Such components or modules may be implemented to perform operations as discussed herein. Memory storage 603 may store images, image instances, switchable network parameters, labels or label data, or any other data discussed herein.

As shown, in some examples, one or more of selector 310, shared convolutional layers 611, normalization modules 612, global average pooling modules 613, and fully connected layer 122 are implemented via central processor 601. In other examples, one or more or portions of selector 310, shared convolutional layers 611, normalization modules 612, global average pooling modules 613, and fully connected layer 122 are implemented via image processor 602, a video processor, a graphics processor, or the like. In yet other examples, one or more or portions of selector 310, shared convolutional layers 611, normalization modules 612, global average pooling modules 613, and fully connected layer 122 are implemented via an image or video processing pipeline or unit.

Image processor 602 may include any number and type of graphics, image, or video processing units that may provide the operations as discussed herein. In some examples, image processor 602 may be an image signal processor. For example, image processor 602 may include circuitry dedicated to manipulate image data obtained from memory storage 603. Central processor 601 may include any number and type of processing units or modules that may provide control and other high level functions for system 600 and/or provide any operations as discussed herein. Memory storage 603 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory storage 603 may be implemented by cache memory.

In an embodiment, one or more or portions of selector 310, shared convolutional layers 611, normalization modules 612, global average pooling modules 613, and fully connected layer 122 are implemented via an execution unit (EU) of image processor 602. The EU may include, for example, programmable logic or circuitry such as a logic core or cores that may provide a wide array of programmable logic functions. In an embodiment, one or more or portions of selector 310, shared convolutional layers 611, normalization modules 612, global average pooling modules 613, and fully connected layer 122 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of selector 310, shared convolutional layers 611, normalization modules 612, global average pooling modules 613, and fully connected layer 122 may be implemented via an application specific integrated circuit (ASIC). The ASIC may include an integrated circuitry customized to perform the operations discussed herein. Camera 604 may include any camera having any suitable lens and image sensor and/or related hardware for capturing images or video.

Returning to discussion of FIG. 5, process 500 begins at operation 501, where a first image at a first resolution and a second image at a second resolution less than the first resolution are received for processing. Such images may be received in parallel or in serial. For example, the images may be stored in memory simultaneously or not. Although discussed with respect to two image resolutions for the sake of clarity, any number of input images of any number of available resolutions may be employed. In the discussion of process 500, the operations may be performed by a switchable network that is switchable based on input image resolution.

Processing continues at operation 502, where a convolutional neural network layer is applied to the first image or first feature maps corresponding to the first image using any number of convolutional layer parameters to generate one or more second feature maps corresponding to the first image. For example, the convolutional neural network layer of operation 502 may be a first convolutional neural network layer in the switchable network that is applied to the input image itself or a subsequent convolutional neural network layer that is applied to feature maps generated based on the first image. Furthermore, although discussed herein with respect to all convolutional neural network layers being shared, in some embodiments, unshared convolutional neural network layers may be employed at one or more layers. In some embodiments, the convolutional neural network layer is a pruned convolutional neural network layer or a quantized convolutional neural network layer.

Processing continues at operation 503, where a first normalization is performed on the one or more second feature maps using first normalization parameters to generate one or more third feature maps. For example, the first normalization is performed on the resultant feature maps from operation 502 such that the resultant feature maps were generated directly from the first image or from feature maps corresponding to the first image. The first normalization as applied to the first image is selective based on the resolution of the first image such that the first normalization parameters are applied only to input images having the resolution of the first image. The first normalization and second normalization (discussed with respect to operation 506) may be any suitable normalization discussed herein such as batch normalization.

Processing continues at operation 504, where a first label is generated for the first image using the one or more third feature maps. The first label may be generated using any suitable technique or techniques. In some embodiments, generating the first label comprises applying one or more additional shared convolutional neural network layers each followed by an additional first normalization and applying a fully connected layer. In some embodiments, following a final normalization, global average pooling is applied prior to application of the fully connected layer. In some embodiments, the fully connected layer is shared and applied regardless of input image resolution and the global average pooling is applied selectively based on the input image resolution. In some embodiments, the first normalization and additional first normalizations are selected in response to the first image being at the first resolution.

Processing continues at operation 505, where the convolutional neural network layer is applied to the second image or fourth feature maps corresponding to the second image using the convolutional layer parameters to generate one or more fifth feature maps corresponding to the second image. For example, the convolutional neural network layer of operation 505 may be a first convolutional neural network layer in the switchable network that is applied to the input image itself or a subsequent convolutional neural network layer that is applied to feature maps generated based on the first image. As discussed, the convolutional neural network layer applied at operation 505 implements the same convolutional layer parameters as those applied at operation 502.

Processing continues at operation 506, where a second normalization is performed on the one or more fifth feature maps using second normalization parameters exclusive of the first normalization parameters to generate one or more sixth feature maps. For example, the second normalization is performed on the resultant feature maps from operation 505 such that the resultant feature maps were generated directly from the second image or from feature maps corresponding to the second image. The second normalization as applied to the second image is selective based on the resolution of the second image such that the second normalization parameters are applied only to input images having the resolution of the second image. Notably, the second normalization parameters applied at operation 506 are exclusive of and different with respect to the first normalization parameters applied at operation 503.

Processing continues at operation 507, where a second label is generated for the second image using the one or more sixth feature maps. The second label may be generated using any suitable technique or techniques. In some embodiments, generating the first label comprises applying one or more additional shared convolutional neural network layers each followed by an additional second normalization (selected based on the resolution of the second image) and applying the same fully connected layer as applied at operation 504. In some embodiments, following a final normalization, global average pooling is applied prior to application of the fully connected layer. As discussed, in some embodiments, the fully connected layer is shared and applied regardless of input image resolution and the global average pooling is applied selectively based on the input image resolution.

The switchable network parameters applied with respect to operations 501-507 may be generated using any suitable technique or techniques. For example, the convolutional layer parameters, the first normalization parameters, the second normalization parameters, other shared convolutional layer parameters, other unshared normalization parameters, shared fully connected layer parameters, and unshared global average pooling parameters may be collectively referred to convolutional neural network parameters or pre-trained convolutional neural network parameters. In some embodiments, the pre-trained convolutional neural network parameters are trained based on generation of a training set comprising first and second training images at the first and second resolutions, respectively, and a corresponding ground truth label, the first and second training images corresponding to a same image instance and parameter adjustment, at a training iteration, of the pre-trained convolutional neural network parameters in parallel using a loss term comprising a sum of cross entropy losses based on application of the pre-trained convolutional neural network parameters to the first and second training images. In some embodiments, the parameter adjustment further comprises adjustment to fully connected layer parameters of the pre-trained convolutional neural network parameters, the convolutional layer parameters and fully connected layer parameters to be shared across input image sizes and the first and second normalization parameters to be unshared across the input image sizes.

In some embodiments, the pre-trained convolutional neural network parameters are trained based on generation of on a training set comprising first, second, and third training images at the first resolution, the second resolution, and a third resolutions less than the second resolution, and a corresponding ground truth label, the first, second, and third training images corresponding to a same image instance, generation, at a training iteration, of an ensemble prediction based on first, second, and third predictions made using the first, second, and third training images, respectively, and comparison of the ensemble prediction to the ground truth label. In some embodiments, the ensemble prediction comprises a weighted average of logits corresponding to the pre-trained convolutional neural network parameters as applied to each of the first, second, and third training images, the weighted average of the logits weighted using logit importance scores. In some embodiments, at the training iteration, a parameters update is based on minimization of a loss function comprising a sum of an ensemble loss term based on a classification probability using the ensemble prediction and a distillation loss term based on a divergence of each the first, second, and third predictions from the ensemble prediction. In some embodiments, the distillation loss term further comprises a first divergence of the second prediction from the first prediction, a second divergence of the second prediction from the third prediction, and a third divergence of the third prediction from the first prediction. In some embodiments, the loss function further comprises a sum of cross entropy losses based on application of the pre-trained convolutional neural network parameters to the first, second, and third training images.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 7:
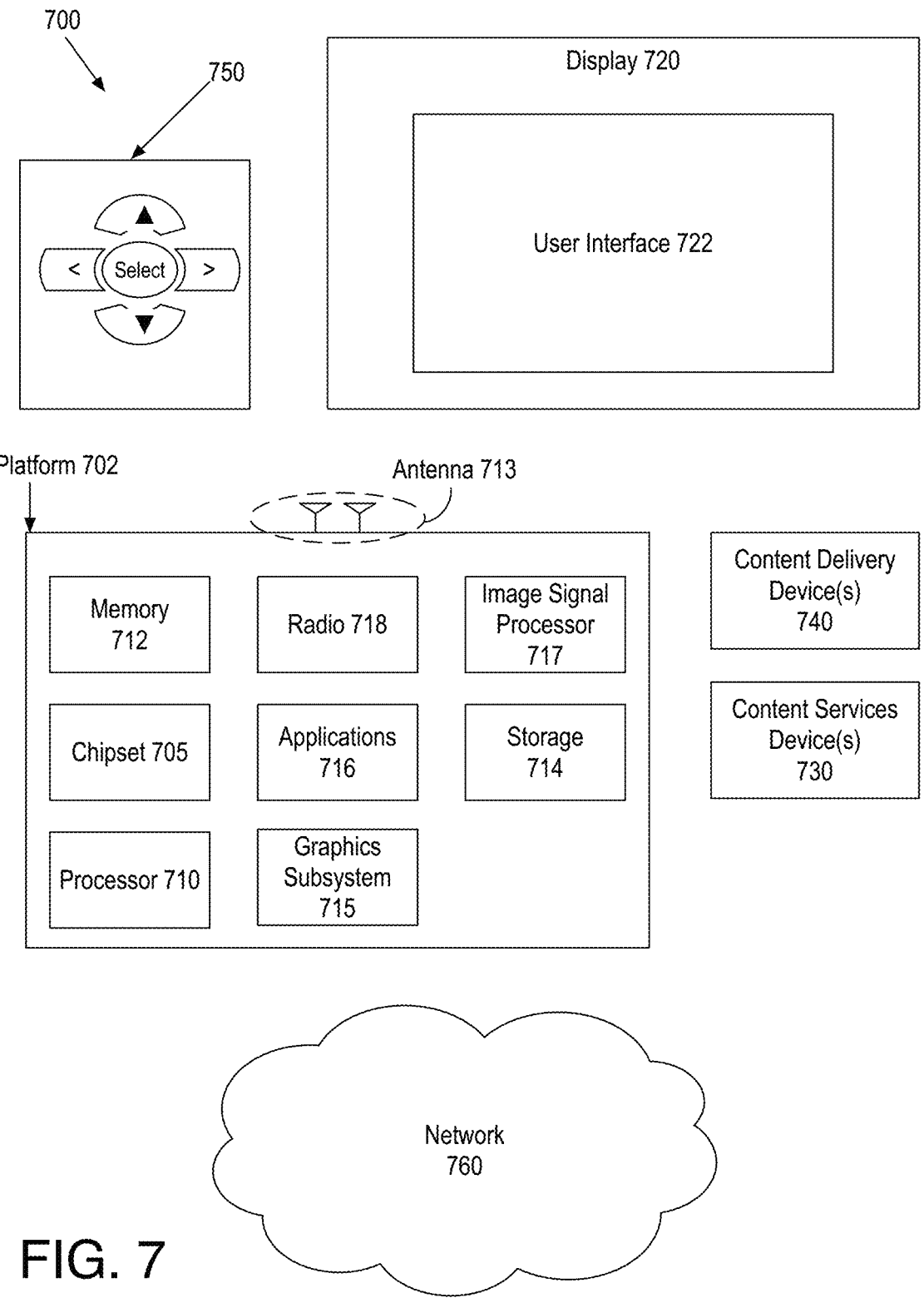
FIG. 7 is an illustrative diagram of an example system.

FIG. 7 is an illustrative diagram of an example system 700, arranged in accordance with at least some implementations of the present disclosure. In various implementations, system 700 may be a mobile system although system 700 is not limited to this context. System 700 may implement and/or perform any modules or techniques discussed herein. For example, system 700 may be incorporated into a personal computer (PC), server, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 700 may be implemented via a cloud computing environment.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, antenna 713, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Image signal processor 717 may be implemented as a specialized digital signal processor or the like used for image or video frame processing. In some examples, image signal processor 717 may be implemented based on a single instruction multiple data or multiple instruction multiple data architecture or the like. In some examples, image signal processor 717 may be characterized as a media processor. As discussed herein, image signal processor 717 may be implemented based on a system on a chip architecture and/or based on a multi-core architecture.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone device communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of uni-directionally or bi-directionally communicating content between content providers and platform 702 and/display 720, via network 760 or directly. It will be appreciated that the content may be communicated uni-directionally and/or bi-directionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of navigation controller 750 may be used to interact with user interface 722, for example. In various embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 750 may be replicated on a display (e.g., display 720)

by movements of a pointer, cursor, focus ring, or other visual indicators displayed on the display. For example, under the control of software applications 716, the navigation features located on navigation controller 750 may be mapped to virtual navigation features displayed on user interface 722, for example. In various embodiments, navigation controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
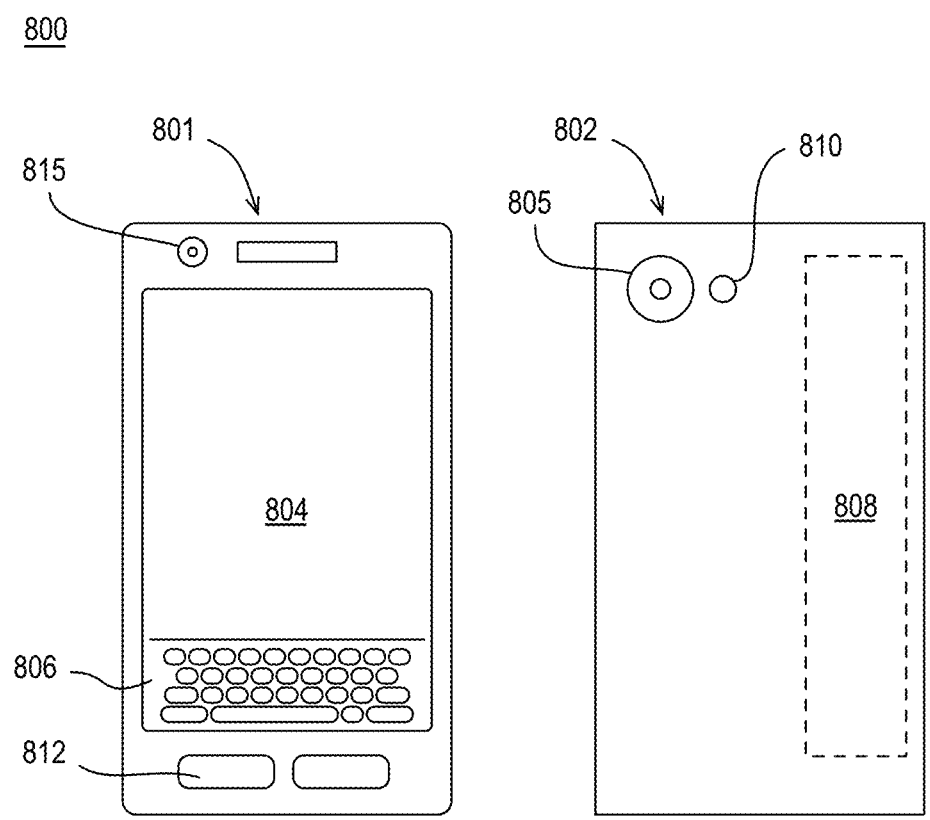
FIG. 8 illustrates an example small form factor device, all arranged in accordance with at least some implementations of the present disclosure.

As described above, system 700 may be embodied in varying physical styles or form factors. FIG. 8 illustrates an example small form factor device 800, arranged in accordance with at least some implementations of the present disclosure. In some examples, system 700 may be implemented via device 800. In other examples, other systems discussed herein or portions thereof may be implemented via device 800. In various embodiments, for example, device 800 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 8, device 800 may include a housing with a front 801 and a back 802. Device 800 includes a display 804, an input/output (I/O) device 806, camera 815, a camera 805, and an integrated antenna 808. Device 800 also may include navigation features 812. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. As shown, device 800 may include camera 805 and a flash 810 integrated into back 802 (or elsewhere) of device 800 and camera 815 integrated into front 801 of device 800. In some embodiments, either or both of cameras 815, 805 may be moveable with respect to display 804. Camera 815 and/or camera 805 may be components of an imaging module or pipeline to originate color image data processed into streaming video that is output to display 804 and/or communicated remotely from device 800 via antenna 808 for example. For example, camera 815 may capture input images and eye contact corrected images may be provided to display 804 and/or communicated remotely from device 800 via antenna 808.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for image classification comprises receiving a first image at a first resolution and a second image at a second resolution less than the first resolution, applying a convolutional neural network layer to the first image or first feature maps corresponding to the first image using a plurality of convolutional layer parameters to generate one or more second feature maps corresponding to the first image, performing a first normalization on the one or more second feature maps using a plurality of first normalization parameters to generate one or more third feature maps, generating a first label for the first image using the one or more third feature maps, applying the convolutional neural network layer to the second image or fourth feature maps corresponding to the second image using the plurality of convolutional layer parameters to generate one or more fifth feature maps corresponding to the second image, performing a second normalization on the one or more fifth feature maps using a plurality of second normalization parameters exclusive of the first normalization parameters to generate one or more sixth feature maps, and generating a second label for the second image using the one or more sixth feature maps.

In one or more second embodiments, further to the first embodiment, generating the first label comprises applying one or more additional convolutional neural network layers each followed by an additional first normalization and applying a fully connected layer, and wherein generating the second label comprises applying the one or more additional convolutional neural network layers each followed by additional second normalization using parameters exclusive of those used in the additional first normalizations and applying the fully connected layer.

In one or more third embodiments, further to the first or second embodiments, the first normalization and additional first normalizations are selected in response to the first image being at the first resolution and the second normalization and additional second normalizations are selected in response to the second image being at the second resolution.

In one or more fourth embodiments, further to any of the first through third embodiments, the convolutional layer parameters, the first normalization parameters, and the second normalization parameters comprise pre-trained convolutional neural network parameters trained based on generation of a training set comprising first and second training images at the first and second resolutions, respectively, and a corresponding ground truth label, the first and second training images corresponding to a same image instance and parameter adjustment, at a training iteration, of the pre-trained convolutional neural network parameters in parallel using a loss term comprising a sum of cross entropy losses based on application of the pre-trained convolutional neural network parameters to the first and second training images.

In one or more fifth embodiments, further to any of the first through fourth embodiments, the parameter adjustment further comprises adjustment to fully connected layer parameters of the pre-trained convolutional neural network parameters, the convolutional layer parameters and fully connected layer parameters to be shared across input image sizes and the first and second normalization parameters to be unshared across the input image sizes.

In one or more sixth embodiments, further to any of the first through fifth embodiments, the convolutional layer parameters, the first normalization parameters, and the second normalization parameters comprise pre-trained convolutional neural network parameters trained based on generation of a training set comprising first, second, and third training images at the first resolution, the second resolution, and a third resolutions less than the second resolution, and a corresponding ground truth label, the first, second, and third training images corresponding to a same image instance, generation, at a training iteration, of an ensemble prediction based on first, second, and third predictions made using the first, second, and third training images, respectively, and comparison of the ensemble prediction to the ground truth label.

In one or more seventh embodiments, further to any of the first through sixth embodiments, the ensemble prediction comprises a weighted average of logits corresponding to the pre-trained convolutional neural network parameters as applied to each of the first, second, and third training images, the weighted average of the logits weighted using logit importance scores.

In one or more eighth embodiments, further to any of the first through seventh embodiments, at the training iteration, a parameters update is based on minimization of a loss function comprising a sum of an ensemble loss term based on a classification probability using the ensemble prediction and a distillation loss term based on a divergence of each the first, second, and third predictions from the ensemble prediction.

In one or more ninth embodiments, further to any of the first through eighth embodiments, the distillation loss term further comprises a first divergence of the second prediction from the first prediction, a second divergence of the second prediction from the third prediction, and a third divergence of the third prediction from the first prediction.

In one or more tenth embodiments, further to any of the first through ninth embodiments, the loss function further comprises a sum of cross entropy losses based on application of the pre-trained convolutional neural network parameters to the first, second, and third training images.

In one or more eleventh embodiments, further to any of the first through tenth embodiments, the convolutional neural network layer comprises one of a pruned convolutional neural network layer or a quantized convolutional neural network layer.

In one or more twelfth embodiments, a device or system includes a memory and a processor to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for image classification, the system comprising:
   a non-transitory memory to store a first image at a first resolution and a second image at a second resolution less than the first resolution; and
   one or more processors coupled to the memory, the one or more processors to:
   apply a convolutional neural network layer to the first image or first feature maps corresponding to the first image using a plurality of convolutional layer parameters to generate one or more second feature maps corresponding to the first image;
   perform a first normalization on the one or more second feature maps using a plurality of first normalization parameters to generate one or more third feature maps;
   generate a first label for the first image using the one or more third feature maps;
   apply the convolutional neural network layer to the second image or fourth feature maps corresponding to the second image using the plurality of convolutional layer parameters to generate one or more fifth feature maps corresponding to the second image;
   perform a second normalization on the one or more fifth feature maps using a plurality of second normalization parameters exclusive of the first normalization parameters to generate one or more sixth feature maps; and
   generate a second label for the second image using the one or more sixth feature maps.

2. The system of claim 1, wherein the one or more processors are to generate the first label by applying one or more additional convolutional neural network layers each followed by an additional first normalization and applying a fully connected layer, and wherein the one or more processors are to generate the second label by applying the one or more additional convolutional neural network layers each followed by additional second normalization using parameters exclusive of those used in the additional first normalizations and applying the fully connected layer.

3. The system of claim 2, wherein the first normalization and additional first normalizations are selected in response to the first image being at the first resolution and the second normalization and additional second normalizations are selected in response to the second image being at the second resolution.

4. The system of claim 1, wherein the convolutional layer parameters, the first normalization parameters, and the second normalization parameters include pre-trained convolutional neural network parameters trained based on:
   generation of a training set including first and second training images at the first and second resolutions, respectively, and a corresponding ground truth label, the first and second training images corresponding to a same image instance; and
   parameter adjustment, at a training iteration, of the pre-trained convolutional neural network parameters in parallel using a loss term including a sum of cross entropy losses based on application of the pre-trained convolutional neural network parameters to the first and second training images.

5. The system of claim 4, wherein the parameter adjustment includes adjustment to fully connected layer parameters of the pre-trained convolutional neural network parameters, the convolutional layer parameters and fully connected layer parameters to be shared across input image sizes and the first and second normalization parameters to be unshared across the input image sizes.

6. The system of claim 1, wherein the convolutional layer parameters, the first normalization parameters, and the second normalization parameters include pre-trained convolutional neural network parameters trained based on:
   generation of a training set including first, second, and third training images at the first resolution, the second resolution, and a third resolution less than the second resolution, and a corresponding ground truth label, the first, second, and third training images corresponding to a same image instance;
   generation, at a training iteration, of an ensemble prediction based on first, second, and third predictions made using the first, second, and third training images, respectively; and
   comparison of the ensemble prediction to the ground truth label.

7. The system of claim 6, wherein the ensemble prediction includes a weighted average of logits corresponding to the pre-trained convolutional neural network parameters as applied to each of the first, second, and third training images, the weighted average of the logits weighted using logit importance scores.

8. The system of claim 6, wherein, at the training iteration, a parameters update is based on minimization of a loss function including a sum of an ensemble loss term based on a classification probability using the ensemble prediction and a distillation loss term based on a divergence of each the first, second, and third predictions from the ensemble prediction.

9. The system of claim 8, wherein the distillation loss term includes a first divergence of the second prediction from the first prediction, a second divergence of the second prediction from the third prediction, and a third divergence of the third prediction from the first prediction.

10. The system of claim 8, wherein the loss function includes a sum of cross entropy losses based on application of the pre-trained convolutional neural network parameters to the first, second, and third training images.

11. The system of claim 1, wherein the convolutional neural network layer includes one of a pruned convolutional neural network layer or a quantized convolutional neural network layer.

12. A method for image classification, the method comprising:
receiving a first image at a first resolution and a second image at a second resolution less than the first resolution;
applying a convolutional neural network layer to the first image or first feature maps corresponding to the first image using a plurality of convolutional layer parameters to generate one or more second feature maps corresponding to the first image;
performing a first normalization on the one or more second feature maps using a plurality of first normalization parameters to generate one or more third feature maps;
generating a first label for the first image using the one or more third feature maps;
applying the convolutional neural network layer to the second image or fourth feature maps corresponding to the second image using the plurality of convolutional layer parameters to generate one or more fifth feature maps corresponding to the second image;
performing a second normalization on the one or more fifth feature maps using a plurality of second normalization parameters exclusive of the first normalization parameters to generate one or more sixth feature maps; and
generating a second label for the second image using the one or more sixth feature maps.

13. The method of claim 12, wherein generating the first label includes applying one or more additional convolutional neural network layers each followed by an additional first normalization and applying a fully connected layer, and wherein the generating of the second label includes applying the one or more additional convolutional neural network layers each followed by additional second normalization using parameters exclusive of those used in the additional first normalizations and applying the fully connected layer.

14. The method of claim 12, wherein the convolutional layer parameters, the first normalization parameters, and the second normalization parameters include pre-trained convolutional neural network parameters trained based on:
generation of a training set including first and second training images at the first and second resolutions, respectively, and a corresponding ground truth label, the first and second training images corresponding to a same image instance; and
parameter adjustment, at a training iteration, of the pre-trained convolutional neural network parameters in parallel using a loss term including a sum of cross entropy losses based on application of the pre-trained convolutional neural network parameters to the first and second training images.

15. The method of claim 12, wherein the convolutional layer parameters, the first normalization parameters, and the second normalization parameters include pre-trained convolutional neural network parameters trained based on:
generation of a training set including first, second, and third training images at the first resolution, the second resolution, and a third resolution less than the second resolution, and a corresponding ground truth label, the first, second, and third training images corresponding to a same image instance;
generation, at a training iteration, of an ensemble prediction based on first, second, and third predictions made using the first, second, and third training images, respectively; and
comparison of the ensemble prediction to the ground truth label.

16. The method of claim 15, wherein, at the training iteration, a parameters update is based on minimization of a loss function including a sum of an ensemble loss term based on a classification probability using the ensemble prediction and a distillation loss term based on a divergence of each the first, second, and third predictions from the ensemble prediction.

17. At least one non-transitory machine readable medium comprising a plurality of instructions that, in response to being executed on a device, cause the device to at least:
receive a plurality of sequential video images including representations of a human face;
receive a first image at a first resolution and a second image at a second resolution less than the first resolution;
apply a convolutional neural network layer to the first image or first feature maps corresponding to the first image using a plurality of convolutional layer parameters to generate one or more second feature maps corresponding to the first image;
perform a first normalization on the one or more second feature maps using a plurality of first normalization parameters to generate one or more third feature maps;
generate a first label for the first image using the one or more third feature maps;
apply the convolutional neural network layer to the second image or fourth feature maps corresponding to the second image using the plurality of convolutional layer parameters to generate one or more fifth feature maps corresponding to the second image;
perform a second normalization on the one or more fifth feature maps using a plurality of second normalization parameters exclusive of the first normalization parameters to generate one or more sixth feature maps; and
generate a second label for the second image using the one or more sixth feature maps.

18. The machine readable medium of claim 17, wherein the instructions are to cause the device to generate the first label by applying one or more additional convolutional neural network layers each followed by an additional first normalization and applying a fully connected layer, and wherein the instructions are to cause the device to generate the second label by applying the one or more additional convolutional neural network layers each followed by additional second normalization using parameters exclusive of those used in the additional first normalizations and applying the fully connected layer.

19. The machine readable medium of claim 17, wherein the convolutional layer parameters, the first normalization parameters, and the second normalization parameters include pre-trained convolutional neural network parameters trained based on:
   generation of a training set including first and second training images at the first and second resolutions, respectively, and a corresponding ground truth label, the first and second training images corresponding to a same image instance; and
   parameter adjustment, at a training iteration, of the pre-trained convolutional neural network parameters in parallel using a loss term including a sum of cross entropy losses based on application of the pre-trained convolutional neural network parameters to the first and second training images.

20. The machine readable medium of claim 17, wherein the convolutional layer parameters, the first normalization parameters, and the second normalization parameters include pre-trained convolutional neural network parameters trained based on:
   generation of a training set including first, second, and third training images at the first resolution, the second resolution, and a third resolution less than the second resolution, and a corresponding ground truth label, the first, second, and third training images corresponding to a same image instance;
   generation, at a training iteration, of an ensemble prediction based on first, second, and third predictions made using the first, second, and third training images, respectively; and
   comparison of the ensemble prediction to the ground truth label.

21. The machine readable medium of claim 20, wherein, at the training iteration, a parameters update is based on minimization of a loss function including a sum of an ensemble loss term based on a classification probability using the ensemble prediction and a distillation loss term based on a divergence of each the first, second, and third predictions from the ensemble prediction.

* * * * *